No. 822,744. PATENTED JUNE 5, 1906.
G. LLOYD
COUPLING.
APPLICATION FILED JULY 28, 1905.
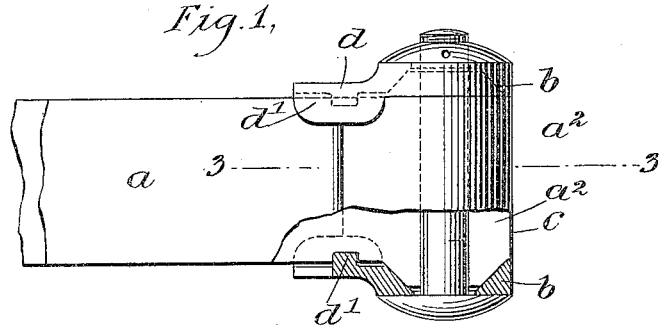
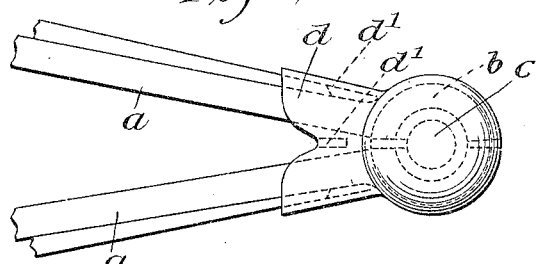
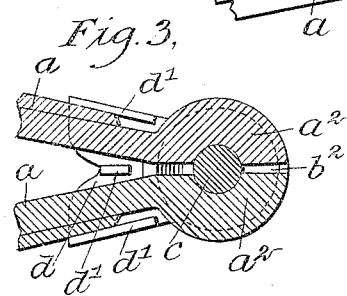
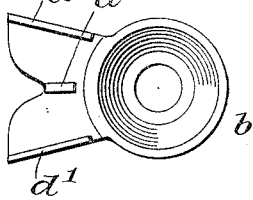
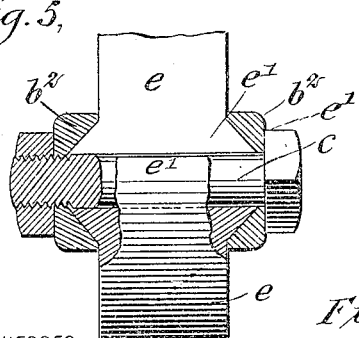
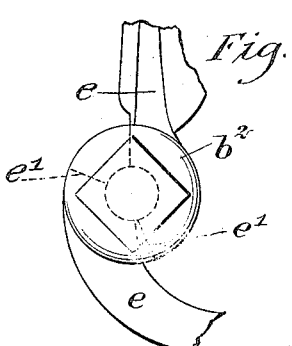
WITNESSES:
Edward Thorpe.
Isaac B. Owens.
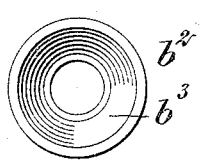
INVENTOR
George Lloyd
BY
ATTORNEYS

UNITED STATES PATENT OFFICE.

GEORGE LLOYD, OF GANANOQUE, CANADA.

COUPLING.

No. 822,744.  Specification of Letters Patent.  Patented June 5, 1906.

Application filed July 28, 1905. Serial No. 271,628.

*To all whom it may concern:*

Be it known that I, GEORGE LLOYD, a subject of the King of Great Britain, and a resident of Gananoque, in the county of Leeds, Province of Ontario, Dominion of Canada, have invented a new and Improved Coupling, of which the following is a full, clear, and exact description.

The invention relates to a coupling useful in various connections, particularly as a means for joining the parts of vehicle-springs and for connecting the thills of a vehicle to the axle-clips; and it resides in certain novel features of construction which will be fully set forth hereinafter, and pointed out in the claims.

Reference is had to the accompanying drawings, which illustrate as an example the preferred embodiment of my invention.

In the drawings, Figure 1 is a view with parts broken away, showing the invention in use as a coupling for the leaves of elliptic vehicle-springs. Fig. 2 is a plan view of the same. Fig. 3 is a section on the line 3 3 of Fig. 1. Fig. 4 is a detail of one of the parts of the coupling shown in Figs. 1, 2, and 3. Fig. 5 is a view with parts broken away, showing the adaptation of the invention as a thill-coupling. Fig. 6 is a side view of the same, and Fig. 7 is a detail view of one of the collars of the coupling.

Referring to Figs. 1, 2, 3, and 4, $a$ indicates the parts of the spring to be coupled. These are provided in any suitable manner with enlargements $a^2$ at their ends, which are formed with conical ends, as shown, and which when matched together, as in Fig. 3, allow the parts of the spring their characteristic movement. Engaged with the conical ends of the enlargements $a^2$ are two coupling-heads $b$. The coupling-heads $b$ are circular and are formed on their inner sides, as shown in Fig. 1, with tapered walls corresponding with and engaging the conical ends of the enlargements $a^2$. The coupling-heads $b$ are drawn up by a tie-bolt $c$, which passes between the enlargements and through the coupling-heads. Each coupling-head has a fan-shaped flange $d$, provided with ribs $d'$ on its inner face, between which ribs the sections of the spring fit, the flanges lying against the edges of the spring and the ribs serving to limit the movement of the parts of the spring. It will also be seen that movement of the parts is limited by the opposing faces of the enlargements $a^2$. The coupling-heads or collars are held snugly against the conical ends of the enlargements $a^2$ by the tie-bolt, and the spring parts are allowed free movement toward and from each other. Wear may be taken up easily by tightening the tie-bolt, thus preventing rubbing of the parts.

Figs. 4, 5, and 6 show the device used as a thill-coupling. In this case the coupling-heads $b^2$ are not provided with the flanges $d$. The inner walls of the coupling-heads or collars are tapered, and the parts $e$, which are to be joined by the coupling, have enlargements $e'$, with conical ends adapted to fit in the coupling-heads, as before explained. The tie-bolt $e$ passes through the coupling-heads and through the parts $e$, drawing them up snugly together, as previously explained. With this coupling the thills are free to swing vertically; but they are prevented from side play, and wear may be taken up quickly by tightening the bolt $f$.

Having thus described the preferred form of my invention, what I claim as new, and desire to secure by Letters Patent, is—

1. In a coupling, the combination with the parts to be coupled, said parts having conical projections, of coupling-heads having tapered walls receiving said tapered projections, and means for forcing said heads snugly in engagement with said projections.

2. In a coupling, the combination with the parts to be coupled, said parts having conical projections, of coupling-heads having tapered walls receiving said tapered projections and projecting flanges having ribs on their inner faces for limiting the motion of the parts to be coupled, and means for forcing said heads into engagement with the parts to be coupled.

In testimony whereof I have signed my name to this specification in the presence of two subscribing witnesses.

GEORGE LLOYD.

Witnesses:
W. T. SAMPSON,
B. O. BRITTON.